United States Patent [19]
Head

[11] Patent Number: 5,934,875
[45] Date of Patent: Aug. 10, 1999

[54] REMOVABLE HELICOPTER MAST

[75] Inventor: Robert E. Head, Tempe, Ariz.

[73] Assignee: McDonnell Douglas Helicopter Company, Mesa, Ariz.

[21] Appl. No.: 08/987,259

[22] Filed: Dec. 9, 1997

[51] Int. Cl.[6] ........................................... A47C 7/74
[52] U.S. Cl. .................... 416/146 R; 416/244; 416/170; 416/143; 416/246
[58] Field of Search ................................ 416/142, 244 R, 416/244 D, 146 R, 113, 114, 170 R, 143, 246; 244/17.27, 7 R, 17.15

[56] References Cited

U.S. PATENT DOCUMENTS

| | | |
|---|---|---|
| 3,019,047 | 1/1962 | Ahrens . |
| 3,133,715 | 5/1964 | Grunfelder . |
| 3,764,229 | 10/1973 | Ferris et al. ............................. 416/144 |
| 5,149,013 | 9/1992 | Costanzo et al. .................... 244/17.11 |
| 5,209,429 | 5/1993 | Doolin et al. ......................... 244/17.11 |
| 5,211,538 | 5/1993 | Seghal et al. . |
| 5,249,926 | 10/1993 | D'Anna et al. . |
| 5,322,415 | 6/1994 | White et al. . |
| 5,785,497 | 7/1998 | White et al. ............................. 416/144 |

*Primary Examiner*—F. Daniel Lopez
*Assistant Examiner*—Ninh Nguyen
*Attorney, Agent, or Firm*—Stout, Uxa, Buyan & Mullins, LLP

[57] ABSTRACT

A helicopter's main rotor blades are removably attached to a hub, which is rotatably mounted on a mast. The base of the mast is attached to the helicopter's body by unthreaded, expandable bushing bolts. When inserted, the bolts' centerlines lie in a plane which perpendicularly intersects the axial centerline of the mast. The mast is hollow and encases a drive shaft. Splines at one end of the drive shaft removably engage splines on the engine transmission. The hub has a removal fitting for engaging an end of the drive shaft. When the mast is detached and pulled apart from the helicopter body for storage, the removal fitting forces the drive shaft splines to disengage from the tnansmission splines, and keeps the drive shaft inside the mast while the mast is being removed. The main rotor blades' pitch is controlled by a plurality of pitch control linkages. Each linkage is comprised of a first part connected to the mast and a second part connected to the helicopter body. The two parts of each linkage are connected solely by an expandable bushing bolt. Removal of the bolt allows the two parts to be disconnected pursuant to removal of the mast from the body, and keeps the first part attached to the mast during the removal and afterwards. Reaachment of the mast to the helicopter body is accomplished by the reverse of the foregoing operations.

10 Claims, 7 Drawing Sheets

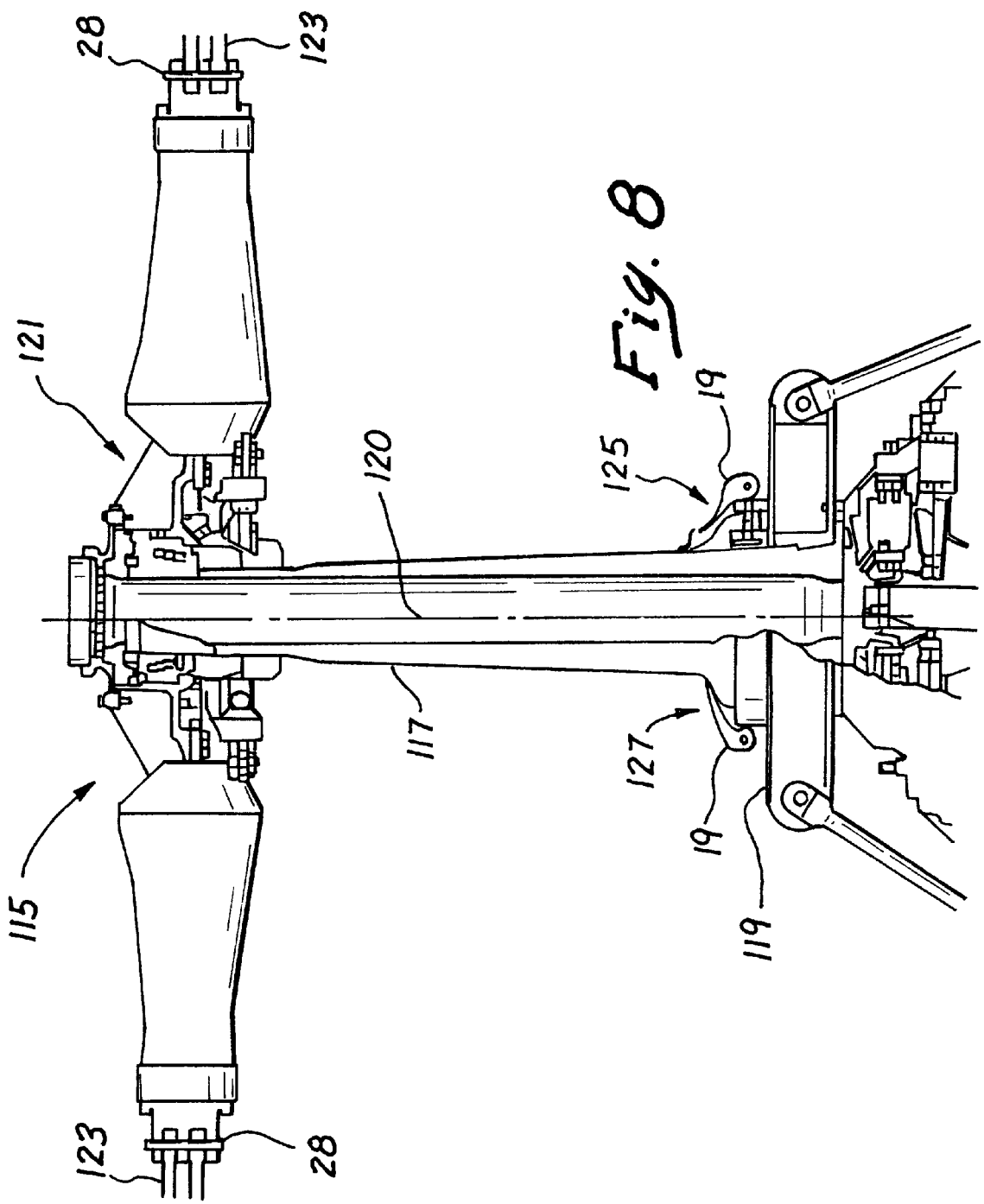

REMOVABLE HELICOPTER MAST

BACKGROUND

1. Field of the Invention

The present invention relates to a helicopter mast which may be temporarily removed to effect the compact storage of a helicopter and, more particularly, to a helicopter mast which may be taken off of the helicopter body together with the encased drive shaft, the rotor hub, and part of the blade pitch control linkage, by removing expandable bushing bolts.

2. Description of the Prior Art

A helicopter is ofttimes transported by airplane or seagoing ship to a distant location where it is to be used. As cargo space is always at a premium aboard the transporting airplane or ship, such transport will typically involve partial disassembly of the helicopter for more compact storage. Especially when the helicopter is to be used for military purposes, it is desirable that the helicopter be easily and quickly reassembled at the destination, preferably without the aid of heavy or complex equipment which must also be shipped to the reassembly location.

The main rotor blades extend radially from a rotor hub which, in turn, is mounted on and rotates about a mast that projects vertically from the helicopter body. The blades are quite long, greatly exceeding the width of the helicopter body, and extend radially from and approximately perpendicularly to the vertical mast. The foregoing operational configuration of the helicopter requires much more storage space than the actual volume that it occupies, makes moving the helicopter in a confined area cumbersome, and exposes the main rotor blades to damage while the helicopter is being moved and during storage.

An approach that has been used in response to this problem has been to fold each of the helicopter's main rotor blades about a hinge in the blade or in the hub. For example, U.S. Pat. No. 5,211,538 issued to Seghal et al., describes folding the main rotor blades about hinges in the blades; while U.S. Pat. Nos. 5,322,415 issued to White et al., and 5,249,926 issued to D'Anna et al., show folding the main rotor blades about hinges located in the hub.

Although the foregoing design reduces the necessary storage space, the mast still projects from the helicopter body when the blades are folded. The projecting mast takes up vertical space and remains exposed to damage. Moreover, folding requires that a hinge be incorporated into each blade or into the respective junctions between the hub and each blade. Such structure adds mechanical complexity, weight and cost to the main rotor blades.

When the blades are straightened, the hinges must be securely locked to ensure that the straightened blades have the rigidity required to generate the lift and control characteristics essential for flight. Furthermore, the folding, unfolding, and locking of each blade may introduce displacements. Such displacements deleteriously affect the precise alignment and functional interactions of the mechanical elements of the blade pitch control system, and thereby degrade the control system's accuracy. Most obviously, the folded blades remain mounted on the helicopter mast during loading, transit, and unloading, thus remaining exposed to damage through accident, negligence or sabotage.

Another approach has been to remove the blades from the hub and store them separately. This avoids some of the problems related to folding the blades. However, the mast still projects from the helicopter body even after the blades have been removed, taking up valuable cargo space. Furthermore, the projecting mast remains exposed to damage during loading, transit, and unloading.

Removing the main rotor blades from the mast and the mast from the helicopter body has also been tried. The mast has heretofore been attached to the helicopter body by threaded bolts which circle the annular base of the mast and are aligned parallel to the mast's centerline. This resolves most of the previously mentioned problems, but at the considerable sacrifice of several of the primary criteria for reassembly, namely, ease and speed. The difficulty lies in complying with the exacting torque specifications required to ensure the proper tension in each of the plurality of bolts which ring the base of the mast.

SUMMARY OF THE INVENTION

Briefly, the present invention is an apparatus providing for the quick and easy removal and reattachment of the mast to the body of a helicopter, to facilitate the helicopter's storage and transportation. A rotor hub is mounted on a mast and is rotatable about the mast's axial centerline. The main rotor blades are removably attached to the hub, and radially extend from the mast's centerline when the hub is mounted on the mast.

The mast is attached at its base to the helicopter body by unthreaded, expandable bushing bolts. Such a bolt has annular split bushings which radially expand when an integral cam is moved by rotating the bolt's handle. The radial expansion of the bushings locks the bolt in place. The axial centerlines of the inserted bolts lie in a plane which perpendicularly intersects the axial centerline of the mast. This configuration prevents the mast from rotating or translating with respect to the helicopter body when the bolts are inserted and tightened.

The mast is hollow and encases a drive shaft. Each end of the drive shaft has splines to allow the drive shaft to be removably engaged with the hub and with the engine transmission, respectively. Engagement enables the helicopter engine to transmit power to the main rotor blades. The mast has a removal fitting which normally lies spaced apart from a grip surface on the drive shaft. When a tensile separation force is applied to the mast, the removal fitting presses against the aforementioned grip surface to pull the mast apart from the helicopter body. More particularly, the abutment of the removal fitting against the grip surface transmits the tensile separation force to the drive shaft and causes the drive shaft splines to disengage from the splines on the transmission, keeps the drive shaft inside the mast, and allows the drive shaft to be removed along with the mast in one operation.

The main rotor blades' pitch is controlled by three pitch control linkages located about the outer circumference of the mast. Each pitch control linkage is comprised of a first part connected to the mast and rotor hub, and a second part connected to the helicopter body. The two parts are connected solely by an expandable bushing bolt. Removal of the three bolts allows the two parts composing each pitch control linkage to be disconnected pursuant to removal of the mast from the body, and keeps the first part of all three linkages attached to the mast during the removal operation and afterwards.

Reattachment of the mast to the helicopter body is accomplished by reversing the foregoing operations.

The assembly composed of the mast, encased drive shaft, rotatably mounted rotor hub, and attached first parts of the three pitch control linkages, can be quickly and easily removed from or reattached to the body of the helicopter by removing or inserting expandable bushing bolts. Removal of the mast provides for a more compact storage volume in comparison to the prior art alternative of keeping the mast attached to the helicopter body in conjunction with either removing or folding the main rotor blades.

Removal of the mast allows the assembly composed of the mast, hub, and attached first parts of the three pitch control linkages to be packed separately from the helicopter body, rather than remain projecting from the helicopter body where it would be exposed to damage. The foregoing also avoids degradation of the accuracy of the pitch control system occasioned by damage either to the main rotor blades or to the pitch control linkages. The present invention obtains the foregoing benefits inuring to removing the mast without the time consuming and exacting process of installing and treading each of a plurality of attaching bolts in the proper order and torqueing each of them to the design specification.

BRIEF DESCRIPTION OF THE DRAWINGS

FIG. 8 is a sectional view of a second preferred embodiment of the present invention wherein the removable mast is directly attached to the helicopter body by means of four expandable bushing bolts.

DETAILED DESCRIPTION OF PREFERRED EMBODIMENTS

Figure 1:
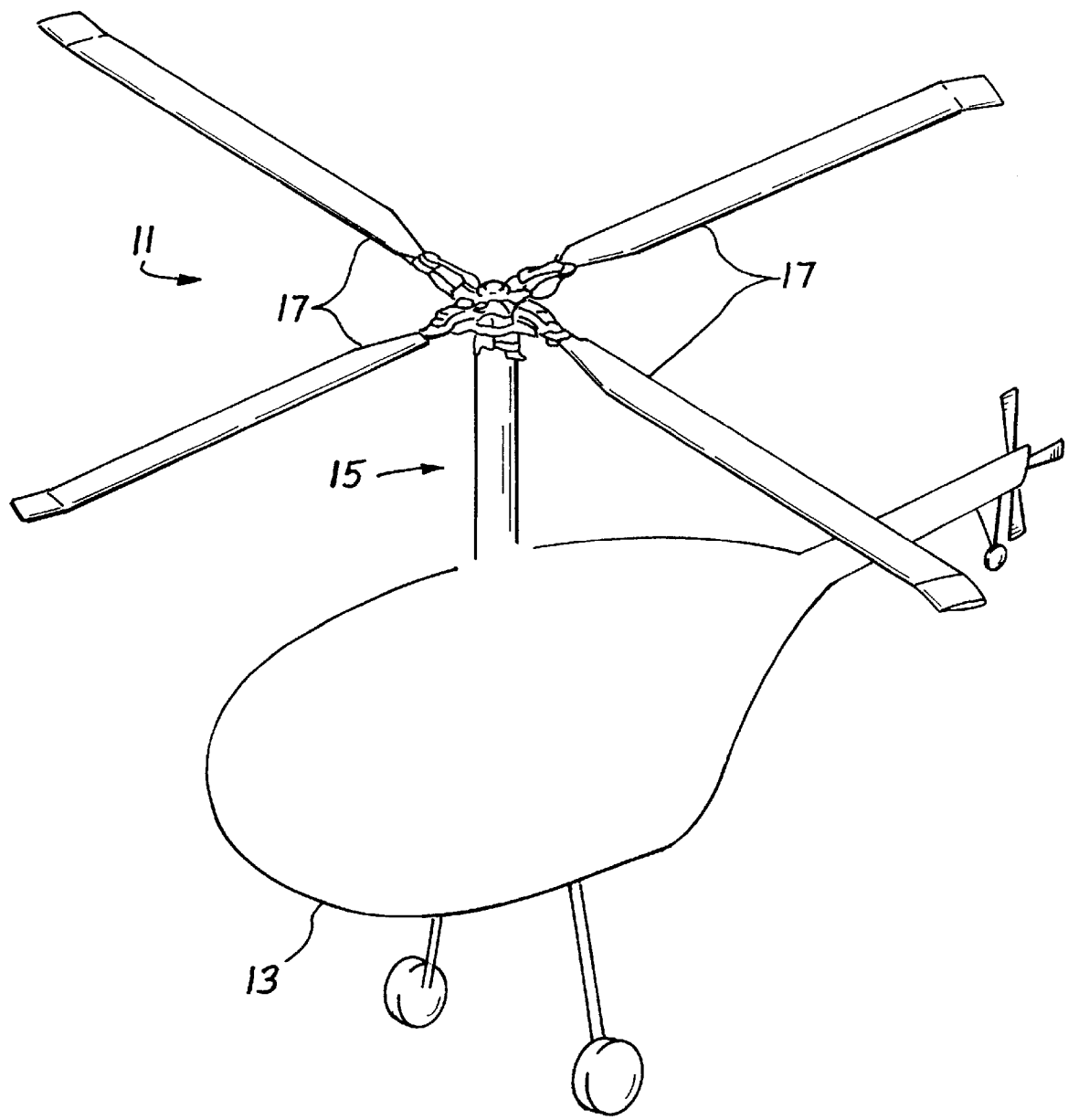
FIG. 1 is a perspective drawing of a helicopter equipped with a preferred embodiment of the present invention.

Turing to the drawings, FIG. 1 shows helicopter 11 comprised of body 13, preferred embodiment 15 of the invention, and main rotor blades 17. As will be subsequently described in detail, preferred embodiment 15 is attached to body 13, and main rotor blades 17 are rotatably mounted on preferred embodiment 15.

Figure 2:
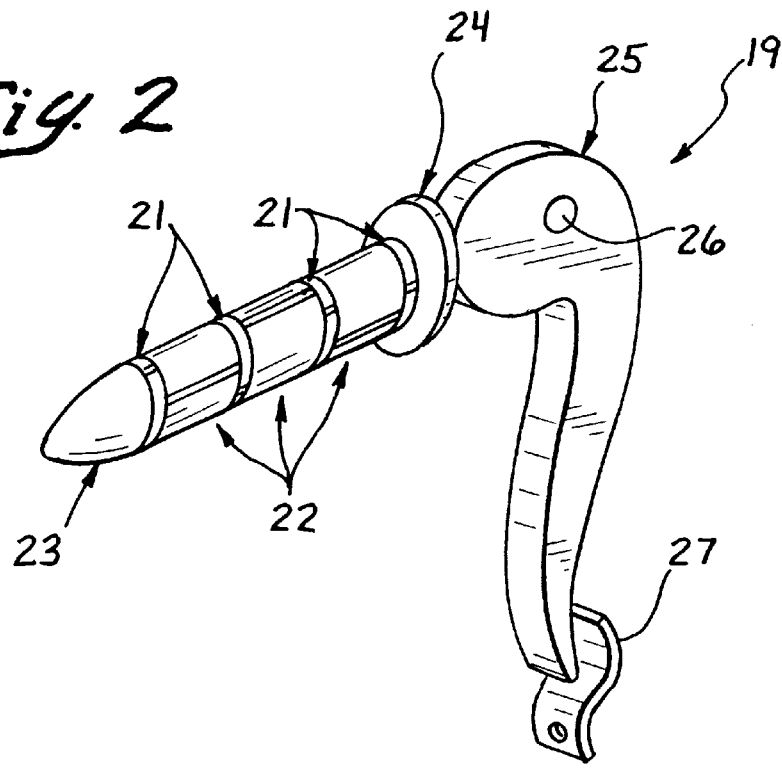
FIG. 2 is a perspective drawing of an expandable bushing bolt which includes a safety clasp to secure its insertion.

FIG. 2 shows unthreaded, expandable bushing bolt 19 comprised of split expandable male annular bushings 21, split female bushings 22, guide 23, washer 24, cam actuator handle 25, and trunion 26. A cam (not shown) is an integral part of handle 25. Counterclockwise rotation of handle 25 moves the cam and, in turn, forces female bushings 22 to expand radially outward. Safety clasp 27 is attached to adjacent structure. When placed in abutment with the end of handle 25, safety clasp 27 prevents inadvertent rotation of handle 25 and consequential loosening of bolt 19.

Figure 3:
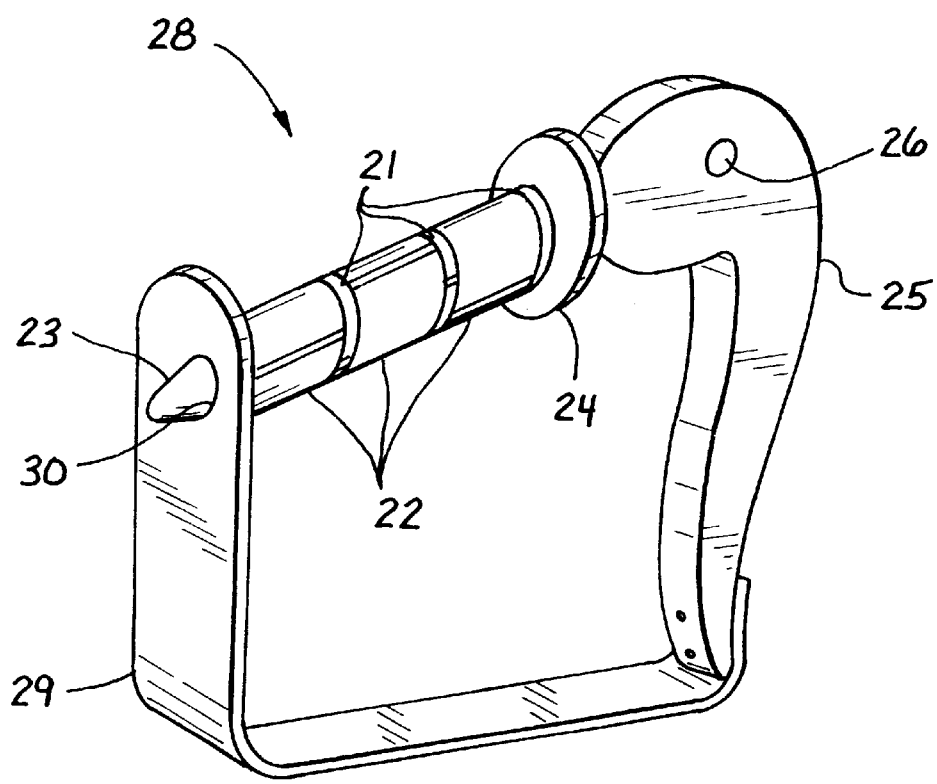
FIG. 3 is a perspective drawing of an expandable bushing bolt which includes a safety spring to secure its insertion.

FIG. 3 shows unthreaded expandable bushing bolt 28. Bolt 28 is identical to bolt 19 in both components and operation, except that bolt 28 includes safety spring 29 attached to handle 25 instead of using clasp 27. Spring 29 includes hole 30 therethrough. The insertion of guide 23 in hole 30 prevents the inadvertent rotation of handle 25, and thereby prevents the accidental loosening of bolt 28.

Figure 4:
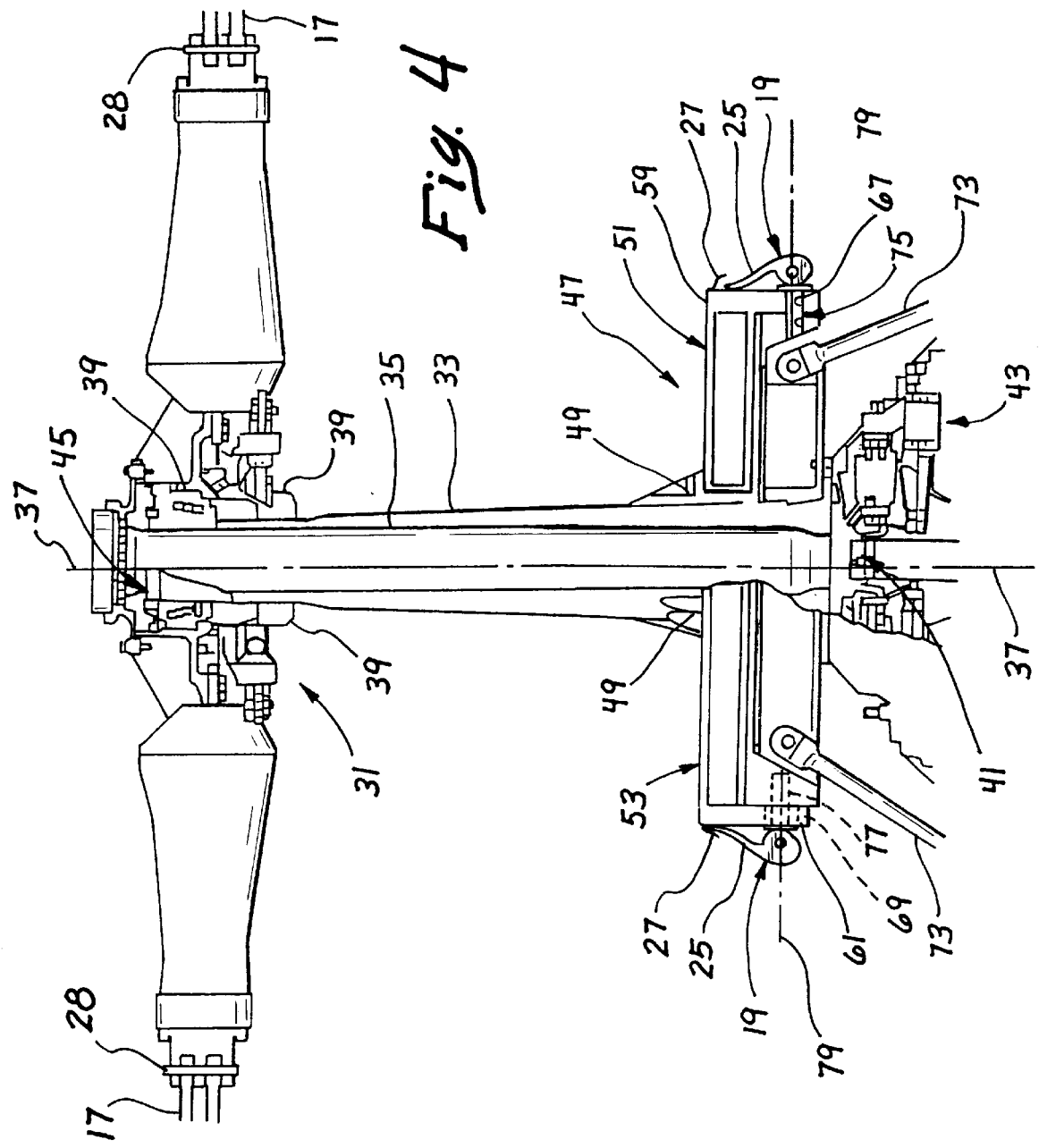
FIG. 4 is a side sectional view of a preferred embodiment of the present invention, wherein the mast is fastened to a mast base which is, in turn, removably attached to the helicopter body by four expandable bushing bolts.
Figure 5:
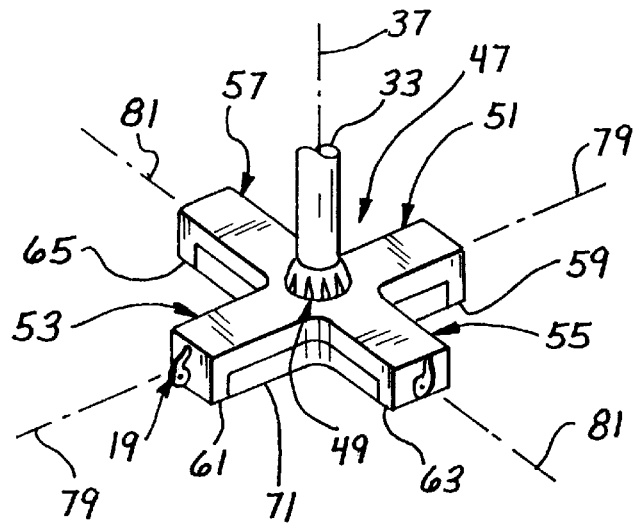
FIG. 5 is a perspective view of part of the aforementioned preferred embodiment, particularly illustrating the mast base and its attachment to the helicopter body.

FIGS. 4 and 5 respectively show sectional and partial perspective views of preferred embodiment 15, including major elements rotor hub 31, mast 33, and drive shaft 35. Main rotor blades 17 are attached to hub 31 by bolts 28. Hub 31 is mounted on mast 33, and both elements have axial centerline 37 in common. Annular bearings 39 allow hub 31 to rotate relative to mast 33, about centerline 37. Mast 33 is hollow and contains drive shaft 35.

Drive shaft 35 rotates about centerline 37, and includes transmission end 41 connected to engine transmission 43, and crown 45 connected to hub 31. Transmission end 41 includes end splines which are engaged with transmission splines in transmission 43. The foregoing connections allow drive shaft 35 to transmit power from the helicopter engine to main rotor blades 17.

Mast 33 is fastened to mast base 47 by a plurality of conventional tension bolts 49. Mast base 47 includes arms 51, 53, 55, and 57. Lugs 59, 61, 63, and 65 are respectively located at the distal end of each arm. Each lug has an unthreaded cylindrical bore passing through it; for example, lug bore 67 passes through lug 59, and lug bore 69 passes through lug 61.

Support platform 71 is an integral part of helicopter body 13, an is attached thereto by truss 73. Platform 71 includes four unthreaded cylindrical bores, including platform bores 75 and 77 (the remaining two are not shown). To attach mast 33 to body 13, mast base 47 is mounted on platform 71 so that each of the bores in the platform is aligned with a corresponding bore in each of lugs 51, 53, 55 and 57. Each aligned pair of lug and platform bores has a centerline, and the centerlines lie in a plane which perpendicularly intersects centerline 37.

In particular, lug bore 67 is aligned with platform bore 75 along centerline 79, and lug bore 69 is aligned with platform bore 77, also along centerline 79. The remaining two aligned pairs of lug and platform bores lie along centerline 81. Centerline 81 lies perpendicular to centerline 79. Bore centerlines 79 and 81 lie in a plane which perpendicularly intersects mast centerline 37.

One bolt 19 is inserted in each aligned pair of lug and platform bores with the aid of guide 23. When inserted, handle 25 protrudes from the aligned pair of bores. Rotation of handle 25 about trunion 26 causes the radial expansion of annular female bushings 23 against the walls of the aligned bores, such as lug bore 67 and platform bore 75, and locks bolt 19 in its inserted position. When all of bolts 19 are locked into their inserted positions, mast base 47 is securely attached to support platform 71, and thus mast 33 is attached to helicopter body 13. Safety clasps 27 ensure that bolts 19 remain securely inserted by preventing the inadvertent rotation of handles 25.

Note that mast 33 does not rotate or translate relative to helicopter body 13 when it is attached thereto. Hub 31, attached main rotor blades 17 and drive shaft 35 all rotate relative to mast 33 and about centerline 37.

Figure 6:
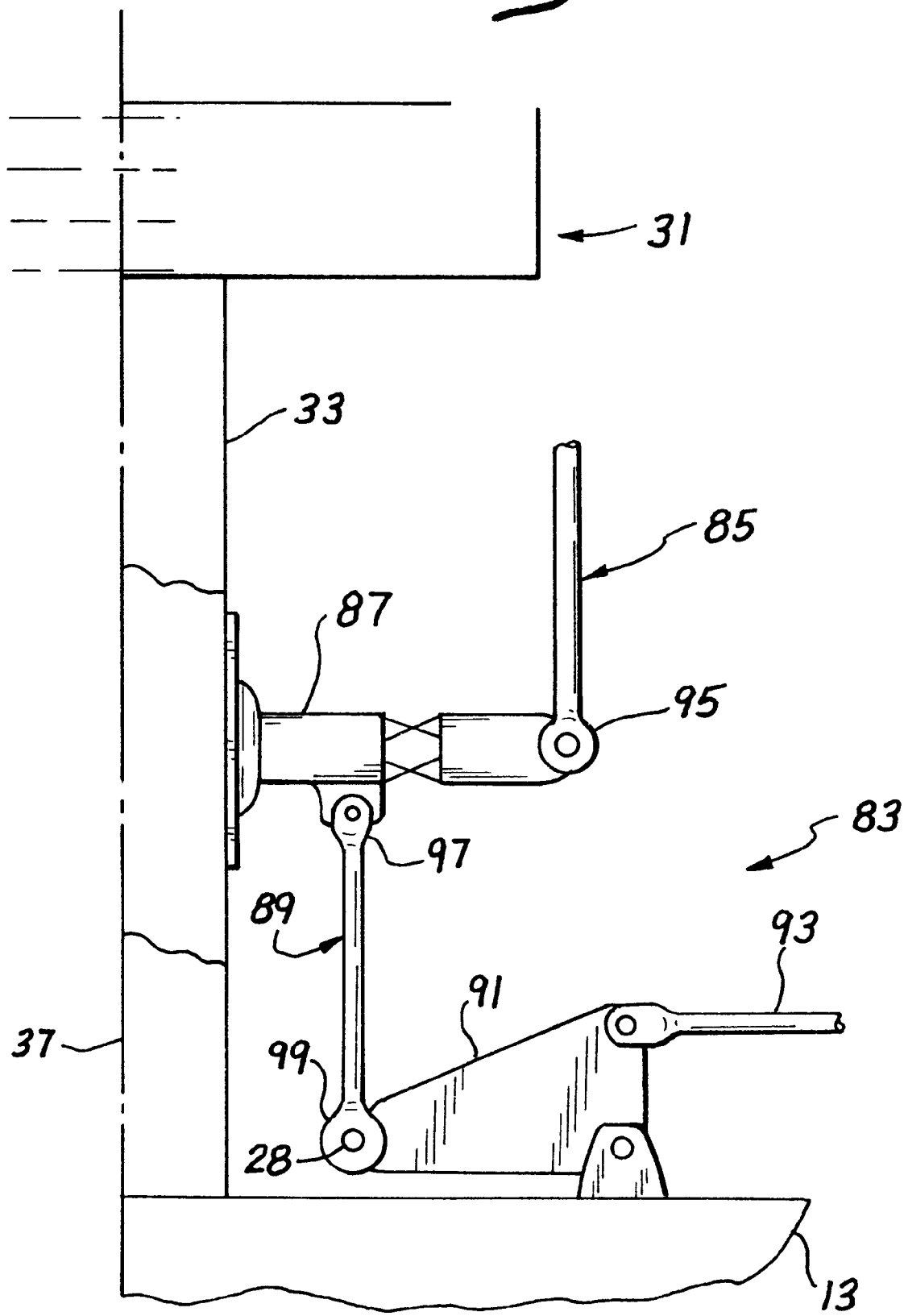
FIG. 6 is a planar view of one of the three pitch control linkages for the main rotor blades.

Embodiment 15 includes three pitch control linkages which allow the pilot to control the pitch angle of main rotor blades 17, and thereby control the flight of helicopter 11. The three pitch control linkages are identical, and are situated about and attached to the outer circumference of mast 33. FIG. 6 shows blade pitch control linkage 83 comprised of blade pitch link 85, swashplate 87, intermediate link 89, bellcrank 91, and pilot linkage 93. For the sake of clarity, the pitch control linkages are not shown in the other drawings.

Blade pitch link 85 has one end (not shown) connected to main rotor blades 17 and its control end 95 rotatively connected to swashplate 87 by conventional means. Swashplate 87 is fastened to mast 33 by conventional means that allow it to slide and tilt relative to mast 33.

Intermediate link 89 has ends 97 and 99. End 97 is rotatively connected to swashplate 87 by conventional means. End 99 is rotatively connected to bellcrank 91 by expandable bushing bolt 28. Bellcrank 91 is rotatively attached to helicopter body 13 by conventional means. Pilot linkage 93 is rotatively connected at one end to bellcrank 91, and at its other end (not shown) to the pilot's controls.

Pursuant to the removal of mast 33 from helicopter body 13, the disconnection from body 13 of the first part of pitch control linkage 83 composed of blade pitch link 85, swashplate 87, and intermediate link 89, is accomplished by disengaging safety spring 29 from guide 23 and removing bolt 28. Since swashplate 87 remains attached to mast 33, intermediate link 89 and blade pitch link 85 also remain attached to mast 33 after its removal from helicopter body 13.

Although embodiment 15 employs three pitch control linkages, the invention could similarly be used in conjunction with a helicopter control system having any number of pitch control linkages.

Figure 7:
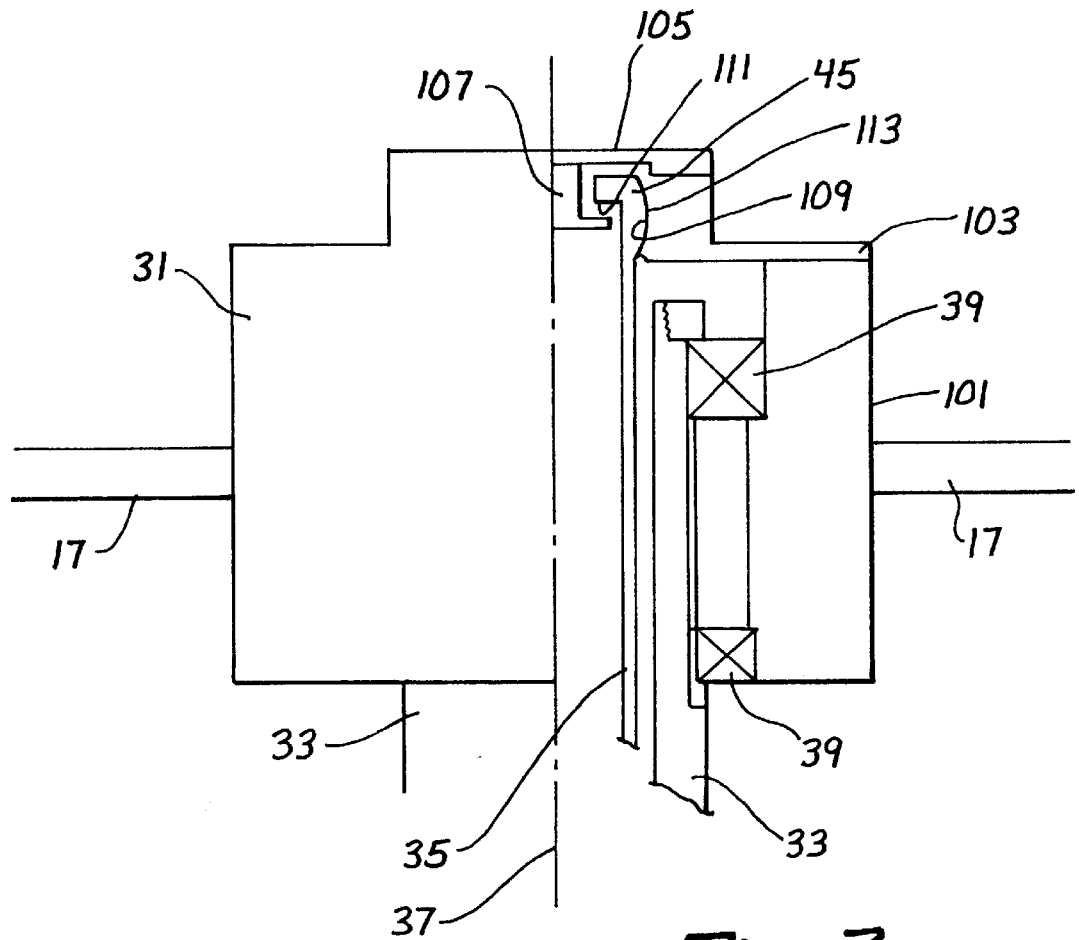
FIG. 7 is a partial sectional view of the upper part of the mast, and particularly shows the relationship between the rotor hub and the drive shaft, and the relationship between the removal fitting of the mast and the grip surface on the drive shaft.

FIG. 7 shows a partial cross-section of hub 31, the top part of mast 33, and enclosed crown 45 of drive shaft 35. Hub 31 is comprised of annular bearings 39, cylindrical casing 101, drive plate 103, cover 105, and drive shaft removal fitting 107. As previously mentioned, annular bearings 39 allow hub 31 to rotate about mast 33 and centerline 37. Drive plate 103 is attached to the top of hub 31 by conventional tension bolts. Main rotor blades 17 are removably attached to hub casing 101 by expandable bushing bolts 28.

Cover 105 is attached to drive plate 103. Removal fitting 107 is attached to cover 105, and extends into hollow mast 33 and, more significantly, into crown 45 of hollow drive shaft 35. Crown 45 includes crown splines 109 and grip surface 111. Drive plate 103 includes drive plate splines 113. Crown splines 109 are removably engaged with drive plate splines 113. This engagement enables power from the helicopter engine to be transmitted to main rotor blades 17.

When mast 33 is to be removed from helicopter body 13, blades 17 are usually first removed from hub 31. All electrical connections between body 13 and mast 33 are disconnected. The first part of each of the three pitch control linkages 83 fixedly attached to mast 33 is then disconnected from the part which remains connected to body 13, by removing the bolt 28 connecting end 99 of intermediate link 89 to bellcrank 91. Bolts 19 attaching mast base 47 to support platform 71 are then removed.

Mast 33 is then pulled apart from body 13 by applying a separation force to mast 33 collinear with centerline 37. The translation of mast 33 relative to body 13 causes removal fitting 107 to press against grip surface 111. This contact transmits the separation force to drive shaft 35, and causes translation of drive shaft 35 relative to body 13.

The foregoing translation pulls the end splines of transmission end 41 of drive shaft 35 apart from the mating splines of transmission 43. Crown splines 109 remain engaged with drive plate splines 113. Drive shaft 35 is thus disengaged from transmission 43, and remains inside mast 33 as mast 33 is pulled apart from body 13.

Reattachment of mast 33 to helicopter body 13 is accomplished by reversing the foregoing operations.

Figure 9:
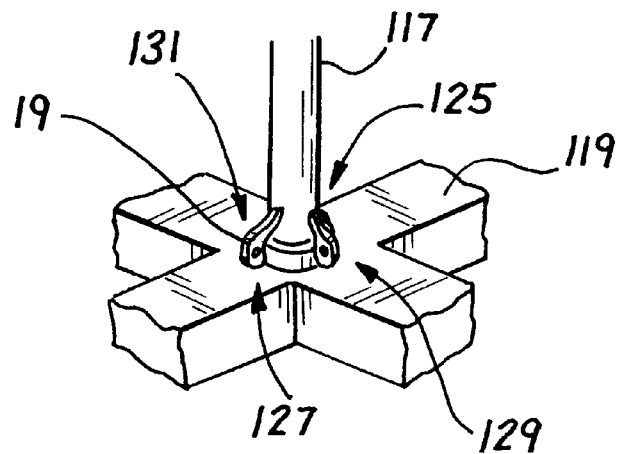
FIG. 9 is a perspective view showing the attachment of the mast to the helicopter body in the second preferred embodiment of the invention.

FIG. 8 is a sectional drawing of embodiment 115, another preferred embodiment of the present invention. Hollow mast 117 is directly attached to support platform 119 of the helicopter body, and includes mast axial centerline 120. In the manner previously discussed in detail with respect to rotor hub 31 and embodiment 15, rotor hub 121 is rotatably mounted on mast 117, and the main helicopter blades 123 are attached to hub 121 by expandable bushing bolts 28. As shown in the perspective view provided by FIG. 9, mast 117 has four identical flanges 125, 127, 129, and 131 extending radially outward where it is attached to support platform 119.

Figure 10:
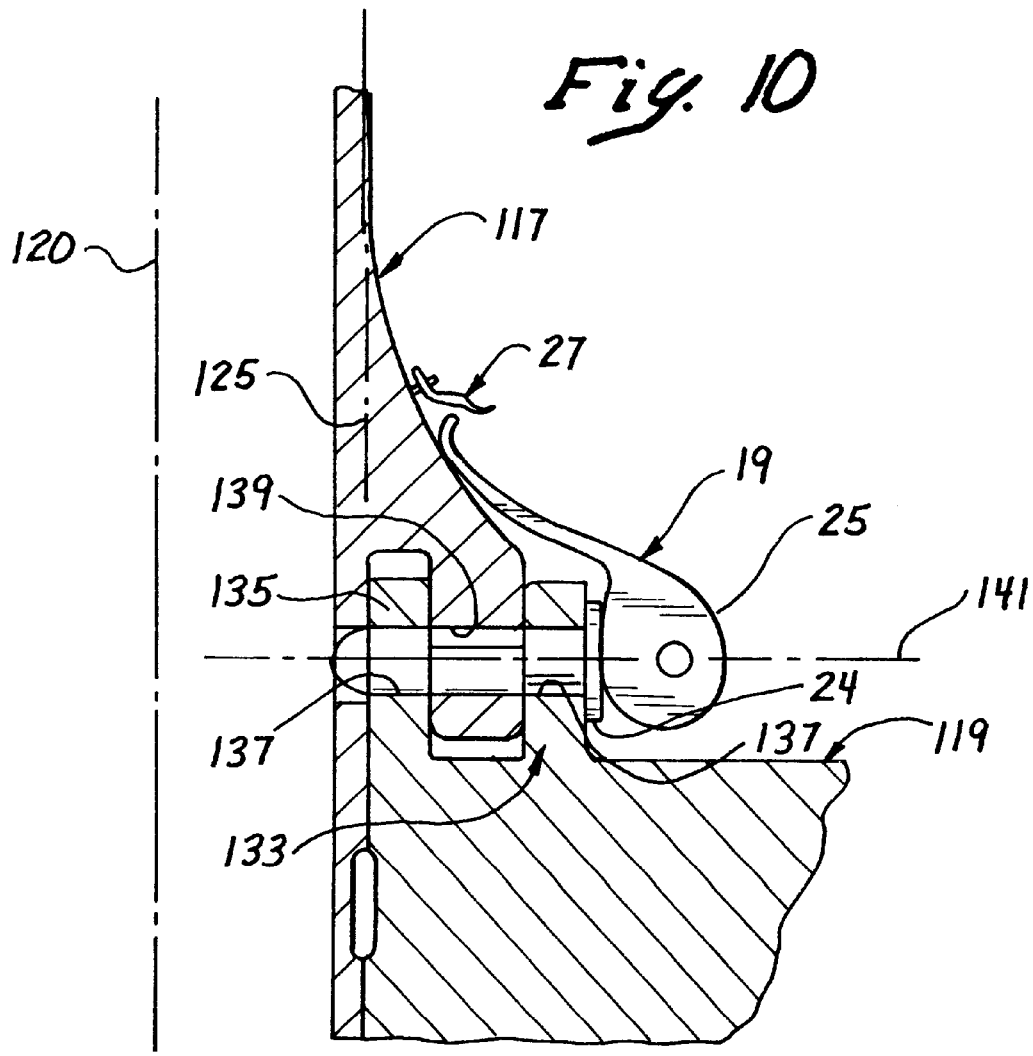
FIG. 10 is an enlarged side sectional view of an expandable bushing bolt inserted through collinear bores in the removable mast and through the body of the helicopter, in the second preferred embodiment of the invention.

FIG. 10 details flange 125, and lugs 133 and 135. The lugs are an integral part of support platform 119. Unthreaded cylindrical bore 137 passes through lugs 133 and 135. Unthreaded cylindrical bore 139 passes through flange 125. Bores 137 and 139 are aligned and have common centerline 141.

Bolt 19 is inserted into aligned bores 137 and 139 by means of guide 23. When inserted, washer 24 abuts lug 133 and handle 25 extends from the aligned bores. Rotation of handle 25 about trunion 29 causes the radial expansion of annular female bushings 22 against the walls of bores 137 and 139, and locks bolt 19 in its inserted position.

Safety clasp 27 is attached to mast 117. After bolt 19 is inserted and handle 25 is rotated to lock bolt 19 in place, clasp 27 presses against the tip of handle 25 to hold it in its locked position and prevent an accidental clockwise rotation, which might lead to the inadvertent release and displacement of bolt 19.

When mast 117 is attached to support platform 119, flanges 127, 129 and 131 respectively abut three remaining sets of lugs in the same manner as discussed with respect to flange 125 and lugs 133 and 135. The bore through each flange and the bore through the abutting lug set are aligned along a common centerline. A bolt 19 is inserted and locked into each aligned bore pair to secure the attachment of mast 117 to support platform 119, and thus to helicopter body 13. The centerlines for the four bore pairs, including centerline 141, lie in a plane which perpendicularly intersects mast centerline 120. This configuration prevents mast 117 from rotating or translating relative to helicopter body 13.

In other respects, including the elements and configuration for the blade pitch control linkages, the encasement of the drive shaft within the mast, and the removable engagement of the drive shaft with the engine transmission, the elements and configuration of embodiment 115 are the same as those described for embodiment 15.

The foregoing embodiments are examples of embodiments of the present invention. These embodiments do not define the invention. The scope and breadth of the invention are defined and limited only by the appended claims.

What is claimed is:

1. A helicopter mast which is removably attachable to a helicopter body, comprising:

said mast having having base bores;

the helicopter body having body bores;

each of said base bores being capable of being aligned with one of said body bores to form an aligned pair;

an expandable bolt having a changeable diameter, with said bolt being capable of having a minimum diameter and an expanded diameter; and said bolt being capable of being inserted into each of said aligned pairs in said minimum diameter, and being locked therein when configured in said expanded diameter, whereby said mast is attached to the helicopter body by having one of said bolts configured in said minimum diameter inserted into each of said aligned pairs, and then having said bolt diameter changed to said expanded diameter so that each of said bolts is locked therein, and said mast is detached from the helicopter body by changing said bolt diameter to said unexpanded diameter for each of said bolts, and removing said bolts from said aligned pairs.

2. The helicopter mast recited in claim 1 further comprising:

a drive shaft; and a hub rotatably mounted on said mast; wherein said mast is hollow and encases said drive shaft; and said hub has a removal fitting for engaging said drive shaft when said mast is pulled apart from said body, whereby said drive shaft remains inside said mast and is moved away from the helicopter body along with said mast when said mast is pulled apart from the helicopter body.

3. The helicopter mast recited in claim 1 further comprising:

main rotor blades attached to said mast;

said main rotor blades having a variable pitch;

a pitch control linkage for controlling said pitch;

said pitch control linkage being comprised of a first part and a second part;

said first part being attached to said mast;

said second part being attached to the helicopter body;

said first part and said second part overlapping at a linkage overlap;

said expandable bolt being insertable into said linkage overlap when configured in said minimum diameter; and said first part being attached to said second part when said bolt is inserted into said linkage overlap and said bolt diameter is changed to said expanded diameter, whereby removal of said bolt from said linkage overlap allows said mast to be detached from the helicopter body, and further allows said first part to remain attached to said mast when said mast is moved away from the helicopter body after the detachment of said mast from the helicopter body.

4. The helicopter mast recited in claim 2 further comprising:

main rotor blades attached to said hub;

said main rotor blades having a variable pitch;

a pitch control linkage for controlling said pitch;

said pitch control linkage being comprised of a first part and a second part;

said first part being attached to said mast;

said second part being attached to the helicopter body; and said first part and said second part being capable of being attached to each other by said expandable bolt.

5. The helicopter mast recited in claim 4 further comprising:

an engine transmission located in said body; wherein the engine transmission includes transmission splines;

said drive shaft has a transmission end, with said transmission end having end splines; and said end splines mesh with the transmission splines, whereby when said mast is pulled away from the helicopter body, said end splines disengage from the transmission splines.

6. The helicopter mast recited in claim 5 wherein:

each of said base bores has an axial base bore centerline;

each of said body bores has an axial body bore centerline;

for each of said aligned pairs, said base bore centerline coincides with said body bore centerline to form an aligned pair centerline; and said aligned pair centerlines are coplanar.

7. The helicopter mast recited in claim 6 wherein:

said mast has an axial mast centerline; and said aligned pair centerlines lie in a plane which intersects said mast centerline at a perpendicular angle.

8. The helicopter recited in claim 7 wherein:

said main rotor blades are capable of being attached to said hub by means of a plurality of said expandable bolts.

9. The helicopter mast recited in claim 8 wherein:

said base bores and said body bores are cylindrical and unthreaded.

10. The helicopter mast recited in claim 9 wherein:

said base bore has a base bore diameter;

said body bore has a body bore diameter; and said base bore diameter is equal to said body bore diameter.

* * * * *